United States Patent [19]

Morris et al.

[11] Patent Number: 4,488,946

[45] Date of Patent: Dec. 18, 1984

[54] UNITARY CENTRAL CELL ELEMENT FOR FILTER PRESS ELECTROLYSIS CELL STRUCTURE AND USE THEREOF IN THE ELECTROLYSIS OF SODIUM CHLORIDE

[75] Inventors: Gregory J. E. Morris, Lake Jackson; Richard N. Beaver, Angleton; Sandor Grosshandler, Houston; Hiep D. Dang, Lake Jackson; John R. Pimlott, Sweeny, all of Tex.

[73] Assignee: The Dow Chemical Company, Midland, Mich.

[21] Appl. No.: 472,792

[22] Filed: Mar. 7, 1983

[51] Int. Cl.³ .................. C25B 1/46; C25B 11/03; C25B 9/00; C25B 13/00

[52] U.S. Cl. .................................. 204/98; 204/128; 204/254; 204/279; 204/286; 204/297 R

[58] Field of Search .................. 204/98, 254, 255, 256, 204/268, 279, 286, 297 R, 128

[56] References Cited

U.S. PATENT DOCUMENTS

| | | | |
|---|---|---|---|
| 3,752,757 | 8/1973 | Stephenson et al. | 204/256 |
| 3,788,966 | 1/1974 | Stephenson et al. | 204/256 |
| 3,859,197 | 1/1975 | Bouy et al. | 204/284 |
| 3,948,750 | 4/1976 | Figueras et al. | 204/286 |
| 3,960,698 | 6/1976 | Bortak | 204/267 |
| 4,017,375 | 4/1977 | Pohto | 204/255 |
| 4,040,934 | 8/1977 | Hoekje et al. | 204/256 |
| 4,105,515 | 8/1978 | Ogawa et al. | 204/98 |
| 4,108,742 | 8/1978 | Seko et al. | 204/98 |
| 4,111,779 | 9/1978 | Seko et al. | 204/255 |
| 4,116,805 | 9/1978 | Ichisaka et al. | 204/254 |
| 4,116,807 | 9/1978 | Peters | 204/290 |
| 4,137,145 | 1/1979 | Wallace | 204/290 |
| 4,149,952 | 4/1979 | Sato et al. | 204/258 |
| 4,155,820 | 5/1979 | Ogawa et al. | 204/98 |
| 4,178,218 | 12/1979 | Seko | 204/98 |
| 4,194,670 | 3/1980 | Ichisaka | 228/179 |
| 4,202,743 | 5/1980 | Oda et al. | 204/98 |
| 4,242,185 | 12/1980 | McRae | 204/98 |
| 4,279,731 | 7/1981 | Pellegri | 204/254 |
| 4,339,322 | 7/1982 | Balko et al. | 204/255 |
| 4,357,218 | 11/1982 | Seko | 204/98 |
| 4,381,230 | 4/1983 | Burney et al. | 204/98 |

FOREIGN PATENT DOCUMENTS 0080288 6/1983 European Pat. Off. .

OTHER PUBLICATIONS

Kaufmann, Dale W., Chapter 10, pp. 201–203, of *Sodium Chloride The Production and Properties of Salt and Brine;* Copyright 1960 by Reinhold Publishing Corporation, N.Y.

Mitchell, D. R. and Kessler, H. D., *The Welding of Titanium to Steel*, Reprinted from *Welding Journal*, Dec. 1961.

*Primary Examiner*—R. L. Andrews
*Assistant Examiner*—Terryence Chapman
*Attorney, Agent, or Firm*—M. W. Barrow

[57] ABSTRACT

Unitary, cast structural element for filter press electrolysis cell which incorporates into a single unit the central barrier between the peripheral boundaries for the adjacent anolyte compartment and adjacent catholyte compartment of two electrolysis cells located on opposite sides of the central barrier. Also incorporated into the single cast structural element are anode bosses and cathode bosses extending outwardly from opposite sides of the central barrier. These bosses not only serve as mechanical support for their respective flat plate anode and cathode, but also they serve as stand-off means and electrical current collectors and dispersers from the cathode of one electrolysis cell to the anode of the next cell. Simplicity of design coupled with incorporation of many functional elements into one part eliminates many cell warpage problems, inherent high voltage problems and membrane "hot spot" problems.

47 Claims, 5 Drawing Figures

UNITARY CENTRAL CELL ELEMENT FOR FILTER PRESS ELECTROLYSIS CELL STRUCTURE AND USE THEREOF IN THE ELECTROLYSIS OF SODIUM CHLORIDE

BACKGROUND OF THE INVENTION

This invention relates to an improvement in the structure of bipolar electrode-type, filter press-type electrolysis cells. More particularly it relates to those of such cells which employ permselective ion exchange membranes planarly disposed between flat surfaced, parallel, foraminous, metal anodes and cathodes when said anodes and cathodes are mounted at a distance from the fluid impermeable structure of the bipolar electrode which physically separates adjacent electrolysis cells. Such cells are particularly useful in the electrolysis of aqueous solutions of alkali metal chlorides; especially in the electrolysis of aqueous solutions of sodium chloride (sodium chloride brine). The cell structure may also be used in electrolyzing other solutions to make products such as potassium hydroxide, iodine, bromine, bromic acid, persulfuric acid, chloric acid, deuterium, tritium, adiponitrile and other organic compounds made by electrolysis.

The unitary filter press central cell element of the present invention decreases the cost of manufacture of the cell units, decreases the labor required to assemble them, simplifies their manufacture, greatly reduces the warpage of the cell unit parts, and provides a much sturdier cell structure than do bipolar, filter press cells of the prior art.

Reducing the warpage of cell structure allows the cell to be operated more efficiently; i.e., produce more units of electrolysis products per unit of electricity. Reducing the warpage reduces the deviation from design of the gap width between the anode and cathode of each electrolysis cell. Ideally this gap width is uniformly the same between the anode and cathode in order to have a uniform current density spread between the faces of the cell electrodes. Among other things, structural warpage causes deviation of this gap resulting in some parts of the anode and cathode being closer together than others. At these locations, the electrical resistance is less, the electrical current is more, and thus the electrical heating is greater. This electrical heating is sufficient in many instances to cause damage to the membrane at these locations. These locations of unacceptably high electrical current concentration and high heat are referred to herein as "hot spots".

To avoid these hot spots, the prior art has had to design its cell structures with a greater than desired gap width between the anode and cathode of each electrolysis cell. This, of course, increases the cell operating voltage and decreases the cell operating efficiency. Complexity of design and fabrication is another drawback of those cells.

Except for the structures used for the terminal cells of a bipolar filter press cell series, the structures for the intermediate cells in the series are like, repetitious, cell structural units which are squeezed together. Examples of such cells operated in a cell series are disclosed in Seko, U.S. Pat. No. 4,111,779 (Sept. 5, 1978) and in Pohto, U.S. Pat. No. 4,017,375 (April 12, 1977). These patents are herein incorporated by reference for purposes of showing representative prior art and for showing how bipolar filter press cells are formed into and operated in a cell series.

At this point, a clarification should be made about confusing nomenclature sometimes encountered when speaking of a series of bipolar filter press cells. The problem involves the nomenclature often encountered when dealing with the repeating electrolysis cells and the repeating cell structure units used to house these repeating electrolysis cells. In the electrolysis cells there is a membrane planarly disposed in or about the center of each electrolysis cell between a parallel anode and cathode. The membrane divides the electrolysis cell itself into an anolyte and catholyte compartment. However, in appearance in a cell series the membrane often appears to be the division line between repeating cell units. In fact, it often is located at the division between repeating cell structures in the series, but not at the line separating different electrolysis cells. This comes about because the repeating cell structures are situated between and around parts of adjacent, but different, electrolysis cells. Such a repeating cell structure includes structure which defines the periphery of the catholyte compartment of one of two adjacent electrolysis cells. This repeating cell structure includes structure which defines the periphery of the anolyte compartment of the other of the two adjacent electrolysis cells and the barrier structure separating the two electrolysis cells. So the anolyte compartment and the catholyte compartment associated with a given repeating structural unit are compartments of adjacent, but different, electrolysis cells.

These repeating cell structures include several other structural elements which will be discussed below. Herein this repeating structural unit will be referred to as a "bipolar electrode-type, filter press-type electrolytic cell unit". As used with the present invention, this cell unit is referenced in the drawing by reference number 10.

There are other structural elements included in a bipolar electrode-type, filter press-type electrolytic cell unit besides the electrolyte compartments peripheral structure and the electrolyte impervious central barrer. These include an anode, a cathode, an anode stand-off means, a cathode stand-off means, and an electrical current transfer means. The permselective ion-exchange membranes are usually not considered as part of this structural unit although they are present.

The central barrier separates the anolyte compartment of one adjacent electrolysis cell from the catholyte compartment of the other adjacent electrolysis cell.

The anode and cathode are spaced from and spaced on opposite sides of the central barrier by the anode and cathode stand-off means, respectively. This spacing is provided so as to provide room for the electrolyte and electrolysis products to circulate in the space between the electrodes and their central barriers.

The anode stand-off means and cathode stand-off means most often also serve as the electrical current means used to electrically connect the anode on one side of the barrier with the cathode on the opposite side of the barrier. This connection is made through the barrier.

The anode and cathode are usually of the "flat plate" type. That is, they present a planarly disposed working surface, or assembly of surfaces, to their respective membranes. They are most often parallelly disposed to their respective membranes, to the axis plane of the central barrier, and to each other. Also the anode and cathode are usually made of a foraminous metal.

The anolyte compartment is defined by the space between the central barrier and the membrane disposed on the anode side of the central barrier as well as the structure fitted around and between the periphery of this membrane and central barrier. Note, the anode is disposed within the anolyte compartment by definition. Likewise the catholyte compartment is defined as the space between the central barrier and the membrane on the cathode side of the central barrier and by the peripheral structure fitted around and between the periphery of the central barrier and the membrane on the cathode side of the central barrier. Again the cathode is in the catholyte compartment by definition.

The anode and cathode of a repeating unit structure (along with the central barrier and the electrical connecting means which electrically connects the anode to the cathode through the central barrier) are, of course, often referred to as a "bipolar electrode". This is because, in effect, this connection of structure series is as an anode in one electrolysis cell and a cathode in another electrolysis cell.

The above features of a flat plate bipolar electrode-type, filter press-type electrolytic cell unit can also be observed in the following references: U.S. Pat. Nos. 4,364,815; 4,111,779; 4,115,236; 4,017,375; 3,960,698; 3,859,197; 3,752,757; 4,194,670; 3,788,966; 3,884,781; 4,137,144; and 3,960,699.

A review of these patents discloses the above described structural elements in various forms, shapes, and connecting means.

What is surprising to one not skilled in this art is the complexity of connections of these parts as well as the large number of parts required for what seems to be a relatively simple structural assembly problem. Of course, to those skilled in the art this complexity is well understood as the outgrowth of trying to make profitable commercial cell structures for use with the relatively new permselective ion-exchange membranes and the extremes of corrosive conditions extant between the anolyte and catholyte compartments. These membranes operate best at elevated temperatures and high caustic concentrations, e.g., above about 80° C. and about 22% caustic catholyte concentrations. This compounds the problems of constructing profitable cells.

The problem centers around finding an affordable anode material and other materials which can withstand the extremely corrosive conditions of the anolyte chamber. For profitable, commercial operations, titanium is the material which has been found which has the most promise for profitably use.

However, there is a great disadvantage in the use of titanium with other metals suitable for use in the catholyte chamber. This is titanium's inability to form a good weld with ferrous materials and most other materials. This is most unfortunate because steel has been used quite successfully for many years as the cathode material.

The major reason for the complexity existing in the connections as well as the reason for having so many connections and so many separate parts in each filter press cell unit of the prior art stems from the necessity of using titanium coupled with the relatively high cost of titanium with respect to the cost of steel coupled with the necessity of establishing a very low electrical resistance connection between the anode and the cathode. The present invention greatly reduces the number of connections, number of separate parts, and the problems they cause. Further discussion of these problems will be better appreciated by perusing the prior art.

As stated above, one of the main problems is that titanium cannot be successfully welded directly to steel. See Seko, U.S. Pat. No. 4,111,779 at Column 1. Also see Mitchell, D. R.; Kessler, H. D.; "The Welding of Titanium to Steel", *Welding Journal* (Dec. 1961). In the Seko patent, titanium is joined to steel by explosion bonding steel plate to titanium plate. In the Mitchell et al *Welding Journal* article, titanium is indirectly welded to steel by welding through a vanadium intermediate placed between the steel and titanium.

The prior art discloses complex and elaborate schemes devised to electrically and/or mechanically connect the different parts of the cell wherein titanium and titanium alloys are employed. Particularly is this complexity seen to be true with respect to the parts herein referred to as stand-offs which connect the "flat plate" anode and cathode of a bipolar electrode structure to an electrically conductive central barrier at a spaced distance from the central barrier; e.g. Seko U.S. Pat. No. 4,111,779 and Ichisaka et al, U.S. Pat. No. 4,194,670. Other stand-offs are used to support the flat plate electrodes and to electrically and mechanically connect them through holes in a non-conductive central barrier, e.g., Stephenson III, et al, U.S. Pat. No. 3,752,757 and Bortak, U.S. Pat. No. 3,960,698. It will be noticed that in these connections, welds and/or bolts are used to connect the stand-offs to the electrodes and then again to the central barrier or to opposing stand-offs passing through the central barrier. Many problems are associated with these many connections. These problems would not be so formidable if only a few connections were required for each of the many cells in a series, but many are required for each cell to get adequate electrical current distribution.

The present invention reduces these problems by eliminating many of these connections. It does this by integrally casting these stand-offs with the central barrier. Moreover, the connections used to connect the central barrier to the peripheral structure of the anolyte and catholyte compartment are also eliminated by integrally casting these structures with the central barrier.

Other problems associated with having so many such connections include unequal electrical current transfer, warpage of parts, and creation of more stress points in the titanium. Such stress points are subject to attack by atomic hydrogen as well as increased susceptibility to normal chemical corrosion and galvanic corrosion.

The electrical transfer capability of a bolted connection is dependant upon the sufficiency of the friction contact between the threads of the two mating threaded pieces. Many bolts are used in making the connections for each bipolar unit when they are depended upon to connect the electrodes and/or stand-offs. They are depended upon to carry equal amounts of current to avoid "hot spots" on the electrodes and adjacent membranes. However, this would require perfect equality of mating of all threaded surfaces. Perfection can not be closely approximated in these cells without going to extraordinary costs. Hence, "hot spots" do occur, and if they do not burn the membrane, they at least cause distorted electrolysis reaction rates across the face of the electrode.

As to welded connections, electrical transmission through them is dependant upon the percentage of the cross-sectional area of the supposed weld which is actually welded. Maldistribution of the amount of welded surface area from weld to weld across the face of a bipolar electrode is very difficult to avoid. Thus with maldistribution of welds, there occurs maldistribution of electric current which, like the threaded bolt problem, causes the undesired electrical "hot spots" on the membrane and "flat plate" electrodes.

Warpage is another undesired side effect of welding. Welding invariable causes warpage in the workpiece. Warpage problems may initially begin before fabrication. When working with large weldments, the individual parts themselves may not be straight, flat, smooth, etc., which will ultimately cause problems during and after fabrication. For proper alignment and positioning of parts, jigs and fixtures often are not adequate to compensate for such problems.

When working with large flat structures (such as cell bodies) the biggest concern lies with warpage that occurs due to the welding itself. Methods to correct such warpage may include heating/cooling, pressing, heating/pressing, and machining. All such methods of relieving warpage induced by welding, however, may in turn induce additional stresses in the structure and thereby cause secondary warpage in the part. These methods also increase the cost of the cell bodies.

In addition to warpage, other concerns which are common to welded structures include: (1) undesirable weld stresses within the part, (2) defective welds, (3) correcting welds which are defective, (4) examination of the weldment for flaws.

In both the all welded cell structures and the welded and bolted metal cell structures, it is difficult to maintain uniform planes between the anolyte and catholyte compartments. Consequently these nonuniform planes cause a non-uniform electrical current distribution across the active surface of the catholyte and anolyte chambers. Since the distribution of electric current is non-uniform, the electrical reactions are also non-uniform. It occurs vigorously at localized areas and thereby causes localized heating effects there, that is "hot spots".

Another problem associated with these nonuniform planes is that the anode and the cathode cannot be brought sufficiently close to each other without the fear of puncturing the membrane. Thus a large voltage loss is incurred because these electrodes can not be spaced as close to each other as desired.

All of the above leads to a shortening of the life of the electrolytic cell.

The present invention by comparison (cast unitary cell structures) has eliminated most of the problems listed above which are common to the weldment type structure and the welded and bolted structure. As a result, cell electrodes are more uniformly parallel; there is a more uniform distribution of electrical current and electrolytic reaction in the cell during operation; and the invention also provides a leakproof centerboard or central barrier.

Another undesired effect of threads and welds in titanium is that they create stress points in the titanium. These stress points are very susceptible to attack by atomic hydrogen. This attack forms significant concentrations of hydrides of titanium at temperatures greater than 80° C. These hydrides are structurlarly unsound and resistant to the passage of electricity. Thus the purposes for which these threads or welds were made in the first place are substantially undone when hydrides are formed thereat.

The source of this atomic hydrogen is primarily the catholyte chamber where water is electrolyzed to hydrogen and hydroxide. It would seem that little trouble would be expected in titanium located in the anolyte compartment from atomic hydrogen generated in the catholyte compartment, particularly when there is a steel central barrier located between them.

However, this hydrogen diffuses through the steel and does attack titanium stress points with particular devasting results at temperatures greater than 80° C., the temperature above which membrane cells coincidently seem to operate best.

The atomic hydrogen attacks the titanium stress points directly connected to the steel. This is one of the flaws in the reasoning given for using a steel to titanium explosion bonded central barrier as is disclosed and claimed in Seko, U.S. Pat. No. 4,111,779. The whole bonded areas of the titanium is under stress and is therefore subject to the hydride formation discussed above. At first no problem is detected because sufficient hydrogen has not penetrated the steel and reached the titanium. However, as the titanium hydride formation increases in these central barriers at the titanium steel bond, the electrical conductivity and the structural integrity decreases until the central barriers are worthless and even dangerous.

The present invention greatly reduces the risk of titanium hydride formation by creating a structure which has a titanium liner with only a relatively very few stress points in it, and also by locating these stress points at an extreme distance from the hydrogen source with respect to the amount of steel which must be traversed in order to reach any of these few stress points. The only stress points found in the present invention's titanium hot pressed liner are found at the sites where it is welded to the ends of the integrally cast anode bosses. These will be discussed below. It should be understood here, however, that although the present invention has been discussed principally in terms of the commonly used steel and titanium, it is not limited to these materials of construction, albeit they are the preferred material of construction.

STATEMENT OF THE INVENTION

The present invention is an improvement in the cell structure used in forming a bipolar electrode-type, filter press-type electrolytic cell unit. This particular cell unit is capable of being combined with other cell units to form a cell series. In said series the cell structure is separated from adjacent cell structures by ion-exchange, permselective membranes which are sealably disposed between each of the cell structures so as to form a plurality of electrolysis cells. Each of said electrolysis cells has at least one planarly disposed membrane defining and separating the anolyte compartment from the catholyte compartment of each electrolysis cell. The cell structure of this particular cell unit has a central barrier which physically separates the anolyte compartment of an electrolysis cell located on one side of the barrier from the catholyte compartment of an adjacent electrolysis cell located on the opposite side of the barrier. This central barrier has a planarly disposed foraminous, "flat plate" anode situated in its adjacent anolyte compartment and a planarly disposed, foraminous, "flat plate" cathode situated in its adjacent catholyte compartment. Both electrode faces are substantially parallel to the membrane planarly disposed between them and to the central barrier. The central barrier has the anode of the adjacent anolyte compartment electrically connected through it to the cathode of the adjacent catholyte compartment.

These anolyte and catholyte compartments adjacent the central barrier have a peripheral structure around their periphery to complete their physical definition. This cell structure also has an electrical current transfer means associated with it for providing electrical current passage through the central barrier from its adjacent catholyte compartment to its adjacent anolyte compartment. This cell structure includes anode and cathode stand-off means for maintaining the anode and cathode of the two electrolysis cells adjacent the central barrier at predetermined distances from the central barrier.

The improvement of this particular cell structure comprises the central barrier, the anolyte and catholyte compartment peripheral structures, the anode stand-off means, the cathode stand-off means, and at least part of the electrical current transfer means all being integrally formed into a unitary central cell element made from a single casting of a castable metel.

The invention employs the castable metal as part of the electrical current transfer means which transfers electricity through the central barrier from the adjacent catholyte compartment to the adjacent anolyte compartment.

The unitary central cell element is so formed in such a fashion so as to provide the structural integrity required to physically support the adjacent electrolyte compartments while loaded with electrolyte as well as to support the associated electrolysis cell appurtances which are desired to be supported by the unitary central cell element.

The anode stand-off means and that part of the electrical current connecting means located in the unitary central cell element on the anolyte side of the central barrier are combined into a multiplicity of anode bosses projecting a predetermined distance outwardly from the central barrier into the anolyte compartment adjacent the central barrier. These anode bosses are capable of being mechanically and electrically connected either directly to the anode of said anolyte compartment or indirectly to said anode through at least one compatible metal intermediate directly situated in an abutting fashion between said anode and said anode bosses. Preferably these anode bosses all have ends which are flat surfaces which preferably lie in the same geometrical plane.

The cathode stand-off means and that part of the electrical current connecting means located on the catholyte side of the central barrier are combined into a multiplicity of cathode bosses projecting a predetermined distance outwardly from the central barrier into the catholyte compartment adjacent the central barrier. These cathode bosses are capable of being mechanically and electrically connected either directly to the cathode in said adjacent catholyte compartment or indirectly to the cathode through at least one weldably compatible metal intermediate directly situated in an abutting fashion between said cathode and said cathode bosses. Preferably these cathode bosses all have ends which are flat surfaces and which preferably lie in the same geometric plane.

The invention preferably further comprises anode bosses being spaced apart in a fashion such that anolyte can freely circulate through the totality of the otherwise unoccupied adjacent anolyte compartment, and, likewise, said cathode bosses being spaced apart in a fashion such that catholyte can freely circulate throughout the totality of the otherwise unoccupied adjacent catholyte compartment.

Preferably the castable material of the unitary central cell element is selected from the group consisting of iron, steel, stainless steel, nickel, aluminum, copper, chromium, magnesium, tantalum, cadmium, zirconium, lead, zinc, vanadium, tungsten, iridium, rhodium, cobalt, alloys of each, and alloys thereof.

More preferably the metal of the unitary cell element is selected from the group consisting ferrous materials. Ferrous materials are defined herein to mean metallic materials whose primary constituent is iron.

A further element which this invention preferably includes is an anolyte side liner made of a metal sheet fitted over those surfaces on the anolyte compartment side of the cell structure which would otherwise be exposed to the corrosive environment of the anolyte compartments.

Preferably this anolyte side liner is an electrically conductive metal which is essentially resistant to corrosion due to the anolyte compartment environment, and preferably the metal liner is formed so as to fit over and around the anode bosses with the liner being connected to the unitary central cell element at the anode bosses move preferably connected at the ends of the anode bosses.

And preferably the invention comprises having the liner sufficiently depressed around the spaced anode bosses toward the central barrier in the spaces between the bosses so as to allow free circulation of the anolyte between the lined unitary central cell element and the membrane of the adjacent anolyte chamber. Note that the liner replaces the unitary central cell element surface adjacent to the anolyte chamber as one boundary contacting the anolyte.

More preferably, the metal liner is connected to the anode bosses by welding through a metal intermediate which is disposed between the bosses and the liner with the metal of the metal intermediate being weldably compatible with both the metal of the anolyte side liner and the metal of which the unitary central cell element is made, that is weldably compatible with both metals to the point of being capable of forming a ductile solid solution with them at welds of them upon their welding.

In most cases, such as in the construction of chlor-alkali cells, it is preferred that the unitary cell element be made of a ferrous material and the anolyte side liner be made of a metallic material selected from the group consisting of titanium, titanium alloys, tantalum, tantalum alloys, niobium, niobium alloys, hafnium, hafnium alloys, zirconium and zirconium alloys.

In situations where the anolyte side liner metal is not weldably compatible with the metal of the unitary cell element, then in order to be able to weld the liner to the structure, metal coupons are one type of metal intermediate which are suitable to be situated in an abutting fashion between the anode bosses and the anolyte side liner. Each coupon has at least two metal layers bonded together, with the outside metal layer of one side of the coupon abutting the anode boss and the outside metal layer of the opposite side of the coupon abutting the anolyte side liner. The metal layer of the coupons which abuts each anode boss is weldably compatible with the material of which the anode bosses are made and accordingly being welded to said anode bosses. The metal layer of that side of the coupons abutting the anolyte side liner is weldably compatible with the metallic material of which the anolyte side liner is made and accordingly is welded to said liner so that the liner is welded to the anode bosses through the coupons. In some instances wafers made of a single metal or metal alloy serve quite well as intermediates.

In most cases, it is preferred that the anolyte side liner be made of titanium or a titanium alloy, and the castable material from which the unitary central cell element be made is a ferrous material.

In the situation where the anolyte liner is titanium material and the anode bosses are a ferrous material, then it is preferred to have vanadium wafers serve as the weldably compatible metal intermediates interposed between the anode bosses and the adjacent anolyte side liner so that the titanium anolyte side liner can be welded to the ferrous material anode bosses through the vanadium wafers. Vanadium is a metal which is weldably compatible with both titanium and ferrous material.

In some instances it is preferred to have the metal intermediates situated between the anode bosses and the adjacent anolyte side liner joined to the ends of the anode bosses by a film-forming process. Spraying a hot liquid metal, such as vanadium, is one film forming process. Another film forming process is carried out by soldering or brazing the metal to the anode bosses.

In some rare occasions it is found that no metal intermediate is required to be used between the liner and the anode bosses, and that the anolyte side liner can be directly bonded to the anode bosses by welding.

Another way of connecting an anolyte liner to the unitary cell structure when these metals are weldably incompatible is that where no metal intermediate is used, but wherein the anolyte side liner is bonded directly to the anode bosses by explosion bonding.

In many instances it is desired that the anolyte side metal liner extends over the lateral face of the anolyte compartment peripheral structure so as to form a sealing face thereat for the membrane when the cell segments are squeezed together to form a cell series.

In most instances it is desired that the anolyte side liner be connected to the unitary central cell element at the ends of the anode bosses. However, this invention includes connecting the liner to the sides of these bosses and even connecting the liner to the central barrier between the bosses. Preferably, however, the anolyte side liner is welded to the ends of the anode bosses through an intermediate metal coupon or wafer.

A catholyte liner is usually required less frequently than an anolyte liner. However, there are many occasions, such as in high concentration caustic catholyte compartments, wherein a catholyte side liner is needed on the catholyte side of the unitary cell element. Thus this invention also comprises a catholyte side liner made of a metal sheet fitted over those surfaces of the unitary central cell element which would otherwise be exposed to the catholyte compartment of the adjacent electrolysis cell.

This catholyte side liner is made from an electrically conductive metal which is essentially resistant to corrosion due to the catholyte compartment environment. Plastic liners may be used in some cases where provision is made for electrically connecting the cathode to the cathode bosses through the plastic. Also combinations of plastic and metal liners may be used. The same is true for anolyte side liners.

The catholyte liner is depressed sufficiently around the spaced cathode bosses toward the central barrier in the spaces between the bosses so as to allow free circulation of the catholyte between the lined unitary central cell element and the membrane of the adjacent catholyte chamber. Note that the liner replaces the unitary central cell element surface adjacent to the catholyte chamber as one boundary contacting the catholyte.

Unlike the anolyte side liner, it is preferred that the metal catholyte side liner be directly connected to the cathode bosses by welding without a metal intermediate being disposed between the bosses and the liner. A metal intermediate can be used, however. If so, then the metal intermediate must be weldably compatible with both the metal of the catholyte side liner and the metal of which the unitary cell element is made.

In many instances it is desired that the unitary cell element be made of a ferrous material and the metal for the catholyte side liner be selected from the group consisting of ferrous materials, nickel, nickel alloys, chromium, magnesium, tantalum, cadmium, zirconium, lead, zinc, vanadium, tungsten, iridium, and cobalt.

In many instances it is desired that the metal of the unitary central cell element, of the catholyte side liner, and of the cathode of the adjacent electrolysis cell be all selected from the group consisting of ferrous materials.

In some instances it is preferred to have the metal intermediates situated between the cathode bosses and the adjacent catholyte side liner joined to the ends of the cathode bosses by a film-forming process. Spraying a hot liquid metal is one film forming process. Another film forming process is carried out by soldering or brazing the metal to the cathode bosses.

However, in most cases, the metal of the catholyte liner can be welded directly to the unitary cell structure without the need of metal intermediate. Nickel is usually the most preferred catholyte liner material.

The catholyte side metal liner is formed so as to fit over and around the ends of the cathode bosses and is welded directly on one side of the liner to the bosses in a manner so as to provide an electrical connection between the unitary central cell element and the cathode. The cathode itself is directly welded to the opposite side of the cathode side liner.

As with the anolyte side liner, it is preferred that the catholyte side metal liner also extend over the lateral face of the catholyte compartment peripheral structure so as to form a sealing face thereat for the membrane when the cell segments are squeezed together to form a cell series.

In most instances it is desired that the catholyte side liner be connected to the unitary central cell element at the ends of the cathode bosses. However this invention includes connecting the liner to the central barrier between the bosses.

BRIEF DESCRIPTION OF THE DRAWINGS

The invention can be better understood by reference to the drawing illustrating the preferred embodiment of the invention, and wherein like reference numerals refer to like parts in the different drawing figures, and wherein.

DETAILED DESCRIPTION OF THE PREFERRED EMBODIMENT OF THE INVENTION

Figure 1:
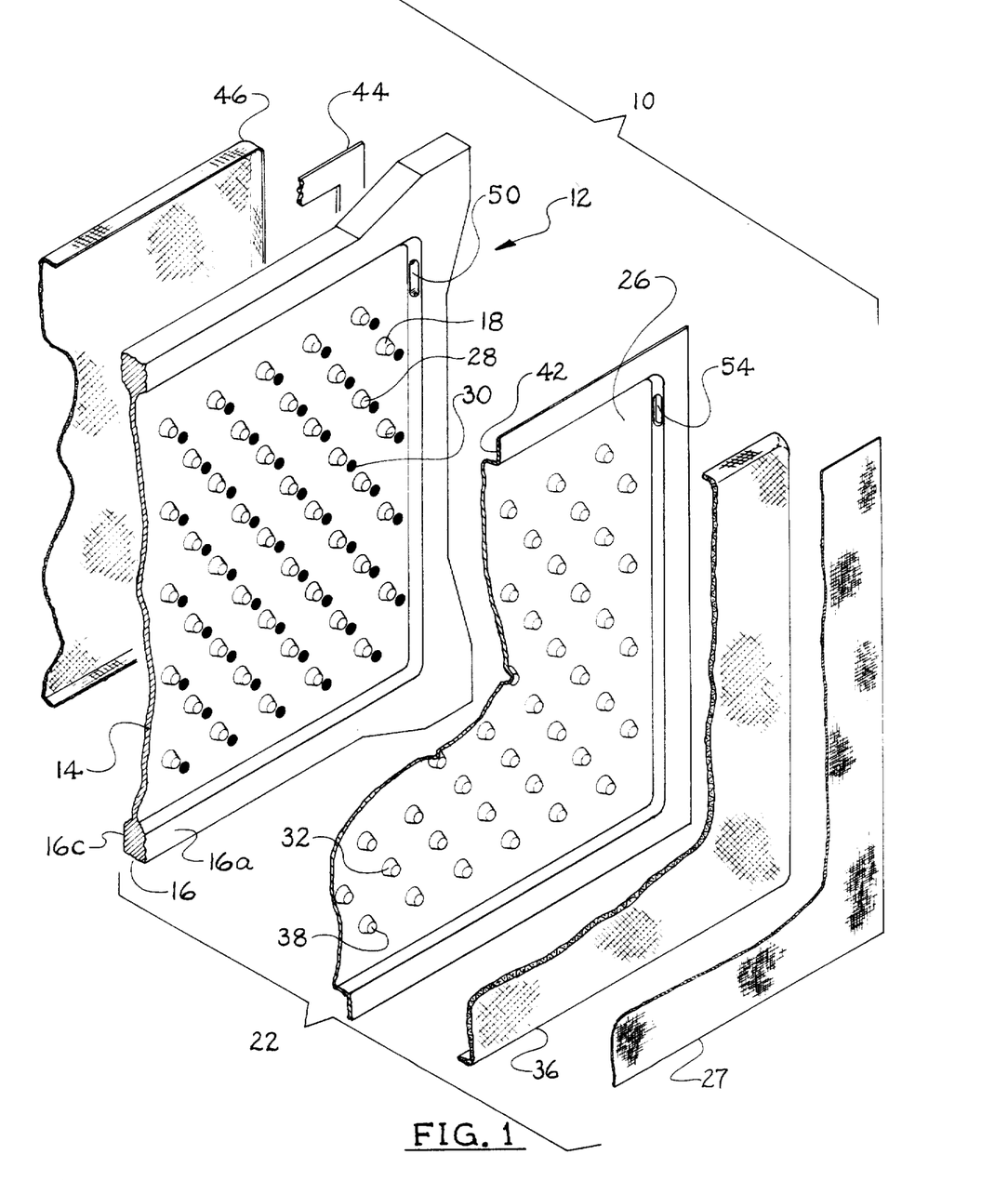
FIG. 1 is an exploded, partially broken-away perspective view of the unitary cell element 12 of this invention shown with accompanying parts forming one bipolar electrode type filter press-type cell unit 10 of a cell series of such cell units.
Figure 2:
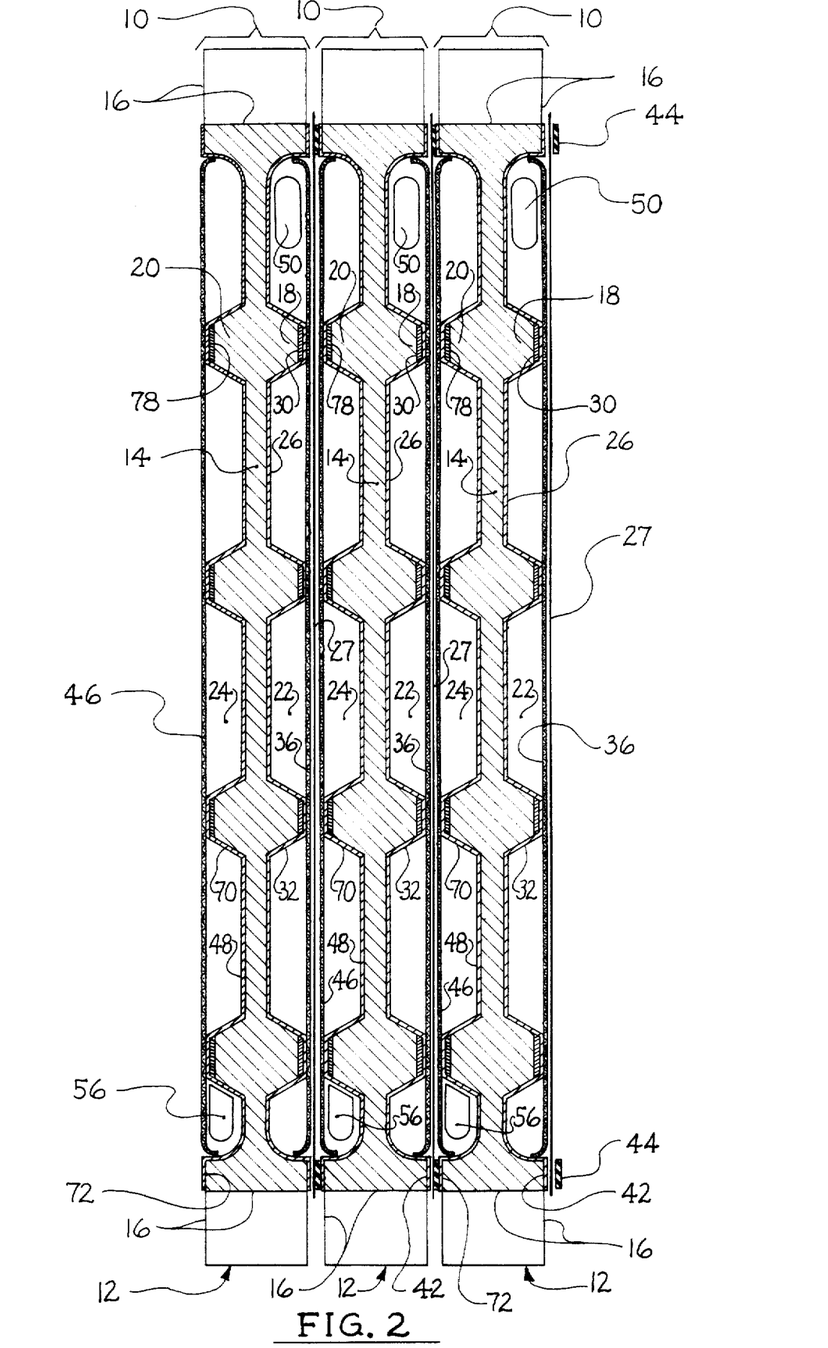
FIG. 2 is a cross-sectional side view of three filter press-type cell units 10 employing the unitary cell elements 12 of the present invention, said cell units shown as they would appear in a filter press cell series, said cross section being taking along and in the direction of line 2—2 in FIGS. 4 and 5.
Figure 3:
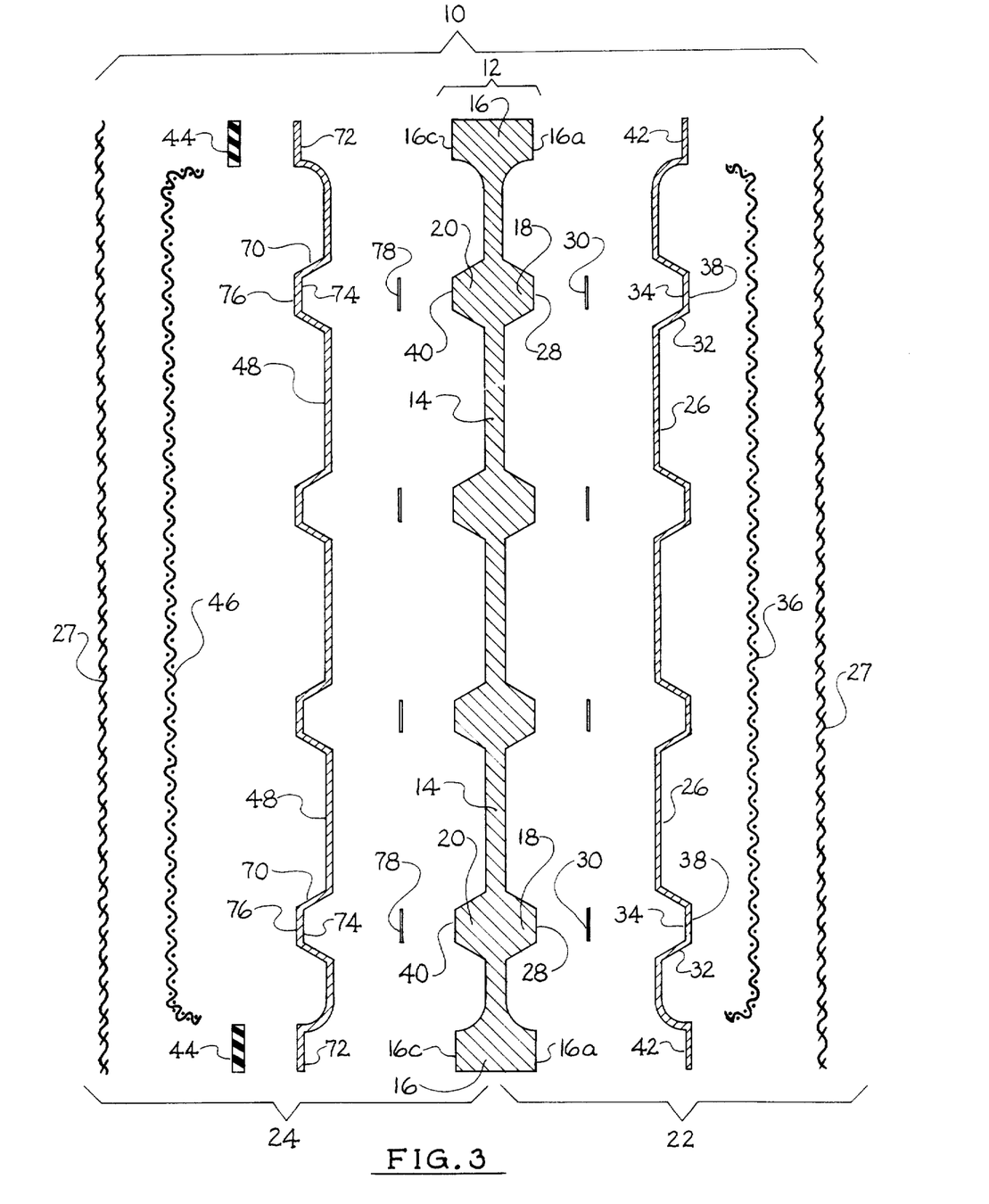
FIG. 3 is an exploded, sectional side view of cell structure used in forming a bipolar electrode-type, filter press-type cell unit 10 which employs the unitary central cell element 12 of this invention, said sectional view being taken along the imaginary cutting plane represented by line 3—3 in FIGS. 4 and 5 in the direction indicated, but said sectional view only showing the cell unit parts which actually touch said imaginary plane in order to omit parts from this FIG. 3 which tend to obscure these features.

Referring to FIGS. 1, 2 and 3, a "flat plate" electrode-type bipolar electrode-type, filter press-type electrolysis cell unit 10 is shown employing the preferred embodiment of the unitary central cell element 12 of this invention.

In the preferred embodiment, unitary central cell unit 12 is made of cast steel. It has a solid central barrier 14, a peripheral flange 16 extending laterally from both sides of the periphery of the central barrier 14, protruding and spaced-apart anode bosses 18, and protruding and spaced-apart cathode bosses 20.

By having these parts all integrally cast into one unit 12, many problems are simultaneously eliminated or greatly reduced. For example, most of the warpage problems, fluid leakage problems, electric current maldistribution problems, and complications of cell construction on a mass production basis are greatly alleviated. This simplicity of cell design allows cell units to be constructed which are much more reliable, but which are constructed at a much more economical cost.

Referring to FIGS. 1, 2 and 3, an anolyte compartment 22 of an adjacent electrolysis cell can be seen on the right side of central cell element 12. On the left side of cell structure 12, a catholyte compartment 24 of a second adjacent electrolysis cell can be seen. Thus cell element 12 separates one electrolysis cell from another. One very important feature in cells of this type is to get electricity from one electrolysis cell to another as cheaply as possible.

On the anolyte compartment side (the right side on FIGS. 1, 2 and 3) of central structure 12, there is an anolyte side liner 26 made of a single sheet of thin titanium. This liner 26 is hot formed by a press in such a fashion so as to fit over and substantially against the surfaces of the unitary central cell unit 12 on its anolyte compartment side. This is done to protect the steel of cell structure 12 from the corrosive environment of the anolyte compartment 22 (FIG. 3). Anolyte side liner 26 also forms the left boundary of anolyte compartment 22 with ion-exchange membrane 27 forming the right boundary (as shown in FIG. 3). Unitary cell element 12 is cast in such a fashion so that its peripheral structure forms a flange 16 which serves not only as the peripheral boundary of the anolyte compartment 22 but also as the peripheral boundary of the catholyte compartment 24. Preferably the titanium liner is formed with no stresses in it in order to provide a liner which atomic hydrogen can not attack as rapidly to form brittle, electrically nonconductive titanium hydrides. Atomic hydrogen is known to attack stressed titanium more rapidly. Avoiding these stresses in the liner is accomplished by hot forming the liner in a press at an elevated temperature of about 900° F. to about 1,000° F. Both the liner metal and press are heated to this elevated temperature before pressing the liner into the desired shape. The liner is then held in the heated press for about forty-five minutes to prevent formation of stresses in it as it cools to room temperature.

Titanium anolyte side liner 26 is connected to steel cell element 12 by resistance welding. This welding is accomplished indirectly by welding the anolyte side liner 26 to the flat ends 28 of the frustro-conically shaped, solid anode bosses 18 through vanadium wafers 30. Vanadium is a metal which is weldable itself and which is weldably compatible with titanium and steel. Weldably compatible means that one weldable metal will form a ductile solid solution with another weldable metal upon the welding of the two metals together. Titanium and steel are not weldably compatible with each other, but both are weldably compatible with vanadium. Hence, vanadium wafers 30 are used as an intermediate metal between the steel anode bosses 18 and the titanium liner 26 to accomplish the welding of them together to form an electrical connection between liner 26 and central cell element 12 as well as to form a mechanical support means for central cell element 12 to supporting anolyte side liner 26.

The preferred fit of the anolyte side liner 26 against the central cell element 12 can be seen from the drawing (FIG. 2). The liner 26 has indented hollow caps 32 pressed into it. These caps 32 are frustoconically shaped, but are hollow instead of being solid as are the anode bosses 18. Caps 32 are sized and spaced so that they fit over and around anode bosses 18. Caps 32 are sized in depth of depression so that their interior ends 34 abut the vanadium wafers 30 when the vanadium wafers 30 are abutting the flat ends 28 of anode bosses 18 and when these elements are welded together. The shape of these bosses and caps is not significant. They could be square shaped or any other convenient shape. However, their ends 28 should all be flat and should all lie in the same imaginary geometrical plane in the preferred embodiment. In fact these anode bosses and caps can be shaped and located so as to guide anolyte and gas circulation.

The titanium anolyte side liner pan 26 is resistance welded at the interior ends 34 of its indented caps 32 to the steel ends 28 of anode bosses 18 through the interposed, weldably compatible, vanadium wafers 30.

Anode 36 is a substantially flat sheet of expanded metal or woven wire made of titanium having a ruthenium oxide catalyst coating on it. It is welded directly to the outside of the flat ends 38 of indented caps 32 of titanium liner 26. These welds form an electrical connection and a mechanical support means for anode 36. Other catalyst coatings can be used.

In FIG. 2 membrane 27 is seen to be disposed in a flat plane between the anode 36 of the one filter press cell unit 10 and the cathode 46 of the next adjacent filter press cell unit 10 so as to form an electrolysis cell between the central barrier 14 of each of the two adjacent unitary central cell elements 12.

Representative of the types of permselective membranes envisioned for use with this invention are those disclosed in the following U.S. Pat. Nos.: 3,909,378; 4,329,435; 4,065,366; 4,116,888; 4,126,588; 4,209,635; 4,212,713; 4,251,333; 4,270,996; 4,123,336; 4,151,053; 4,176,215; 4,178,218; 4,340,680; 4,357,218; 4,025,405; 4,192,725; 4,330,654; 4,337,137; 4,337,211; 4,358,412; and 4,358,547. These patents are hereby incorporated by reference for the purpose of the membranes they disclose.

Of course, it is within the purview of this invention for the electrolysis cell formed between the two cell segments to be a multi-compartment electrolysis cell using more than one membrane, e.g., a three-compartment cell with two membranes spaced from one another so as to form a compartment between them as well as the compartment formed on the opposite side of each membrane between each membrane and its respective adjacent filter press cell unit 10.

The location of anode 36 within anolyte compartment 22 with respect to the membrane 27 and the titanium lined central barrier 14 is determined by the relationships between the lateral extension of flange 16 from central barrier 14, the extension of anode bosses 18 from the central barrier 14, the thickness of the vanadium wafers 30, the thickness of anolyte side liner 26, and the like. It can be readily seen that anode 36 can be moved from a position abutting the membrane 27 to a position with some considerable gap between the membrane 27 and anode 36 by changing these relationships; e.g., changing the extension of anode bosses 18 from the central barrier 14. It is preferred, however, that the flange 16 on the anolyte side of central barrier 14 extend the same distance as do the anode bosses 18 from the central barrier 14. This adds to the simplification of construction of unitary central cell element 12 because, with this circumstance, a machine metal planar can plane both the end surfaces 28 of anode bosses 18 as well as the anolyte side liner lateral face 16a at the same time in a manner so as to form these surfaces into surfaces which all lie in the same geometrical plane. The same preference is true for like surfaces on the catholyte side of unitary central cell element 12, i.e., it is preferred that the flat ends 40 of cathode bosses 20 and the lateral surface 16c of flange 16 which lies on the catholyte side of structure 12 all be machined so as to all lie in the same geometrical plane.

For fluid sealing purposes between membrane 27, and flange surface 16a, it is preferred for anolyte liner 26 to be formed in the shape of a pan with an off-set lip 42 extending around its periphery. Lip 42 fits flush against the anolyte side of lateral face 16a of flange 16, this lateral face 16a being located on the anolyte side of the cell structure 12. The periphery of membrane 27 fits flush against anolyte liner lip 42, and a peripheral gasket 44 fits flush against the other side of the periphery of membrane 27. In a cell series, as shown in FIG. 2, the gasket 44 fits flush against the lateral face 16c of the flange 16 on the catholyte side of the next adjacent cell structure 12 and flush against membrane 27 when there is no pan 48.

Although only one gasket 44 is shown, this invention certainly encompasses the use of gaskets on both sides of membrane 27. It also encompasses the situation where no lip 42 is used.

Figure 4:
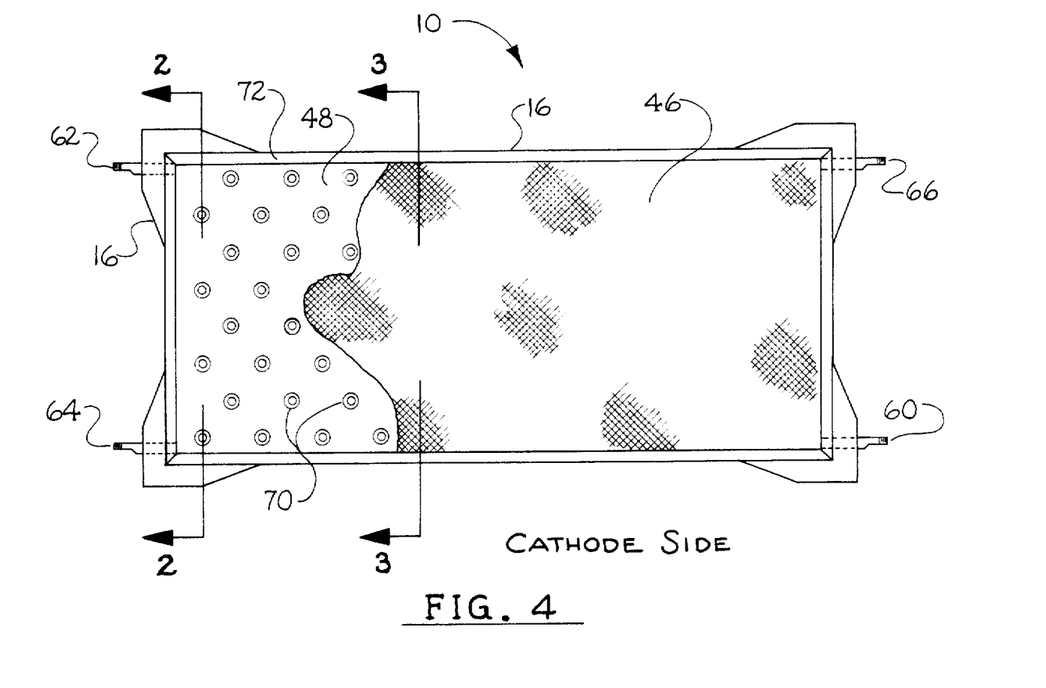
FIG. 4 is a partially broken-away front view of a bipolar electrode type filter press-type cell unit 10 which employs this invention and which is viewed from the cathode side.

On the side of cast steel central cell element 12 opposite the anolyte compartment side, i.e., the catholyte side, there is no catholyte side liner shown in FIG. 1, although there is a catholyte side liner 48 shown in FIGS. 2, 3 and 4. This is done to illustrate the fact that the presence of two liners is sometimes desired but sometimes not. Most often the metal from which central cell element 12 is cast is also suitable for use in either the catholyte compartment 24 or the anolyte compartment 22. For example, in an electrolysis cell series wherein aqueous solutions of sodium chloride are electrolyzed to form caustic and/or hydrogen gas in the catholyte compartment 24, then ferrous materials such as steel are quite suitable for the catholyte compartment metal components at most cell operating temperatures and caustic concentrations, e.g., below about 22% caustic, concentration and at cell operating temperatures below about 85° C. Hence, if cell element 12 is made of a ferrous material such as steel, and if caustic is produced at concentrations lower than about 22% and the cell is to be operated below about 85° C., then a protective liner is not needed on the catholyte side of cell structure 12 to protect the steel cell element 12 from corrosion. But the titanium anolyte side liner 26 is still needed on its anolyte side. Hence, in FIG. 1, there is no catholyte side liner 48 shown. Instead the flat foraminous metal cathode 46 (also made of steel in this embodiment in FIG. 1) is resistance welded directly to the ends 40 of frustroconically shaped cathode bosses 20.

Referring to FIGS. 2 and 3, therein the catholyte side (the left side) of cell element 12 is seen to appear as the mirror image of its anolyte side. The flange 16 forms the peripheral boundary of the catholyte compartment 24, while the central barrier 14 and membrane 27 form its remaining boundaries. Spaced cathode bosses 20 are solid, frustroconically-shaped protrusions extending outwardly from central barrier 14 into catholyte compartment 24. Flat-surfaced, foraminous, steel plate cathode 46 is welded directly to the flattened ends 40 of cathode bosses 20. Again the shape of the bosses 20 are not important. They are preferably flat on their ends 40 and these ends 40 preferably all lie in the same geometrical plane. This also applies to the indented caps 70 of the catholyte side liner 48 discussed below. These cathode bosses and cathode caps 70 can be shaped and located so as to guide the catholyte and gas circulation.

When a metal liner is desired on the catholyte compartment side of unitary central cell element 12, it can easily be provided in the same manner and with similar limitations as is the anolyte compartment side liner 26 provided for anolyte compartment side of cell element 12, described above. Referring to FIGS. 2, 3, and 4, such a catholyte side liner 48 is shown. It is made of a metal which is highly resistant to corrosive attack from the environment of the catholyte compartment 24. The metal must also be sufficiently ductile and workable so as to be pressed from a single sheet of metal into the non-planar form shown. This includes being capable of having the frustroconically-shaped cathode boss indented caps 70 pressed into the single sheet. Of course, these cathode boss caps 70 must be spaced so that they fit over and around the spaced cathode bosses 20 as well as the other parts of the side of the central cell element 12 which would otherwise be exposed to the environment of the catholyte compartment 24. It is preferred that this catholyte side liner 48 have an indented lip 72 extending around its periphery in a fashion so as to flushly abut the lateral face 16c of flange 16 on the side of central cell element 12 which is adjacent the catholyte compartment 24. Liner 48 is preferably connected to central cell element 12 by resistance welding of the liner caps' internal ends directly, in an abutting fashion, to the flat ends 40 of cathode bosses 20. That is, this is preferrable if the metal of the liner 48 and the central support element 12 are weldably compatible with each other. If these metals are not weldably compatible, then there should be used metal intermediates or combinations of intermediates which are weldably compatible with the metal of liner 48 and cell element 12. These intermediates 78 are disposed between the cathode boss flat ends 40 and the liner caps' interior ends 74 which correspond to the boss ends 40.

Metal intermediates 78 are welded to the ends 40 of cathode bosses 20. Catholyte liner 48 is then welded indirectly to the ends 40 of cathode bosses 20 by resistance welding on the interior ends 74 of catholyte liner caps 70 through metal intermediates 78. Cathode 46 is welded to the external end 76 of caps 70. Note that the connection of each liner cap 70 through a metal intermediate 78 to the end 40 of a cathode boss 20 may be made with only one weld; i.e., the metal intermediate does not have to be welded by itself beforehand.

Metal intermediates 78, 30 for both the anolyte side and catholyte side may be metal wafers or metal coupons. By metal wafers, it is meant that the wafer be a single metal which is weldably compatible with both the metal of the cell element 12 and the metal of the respective liners 26 or 48. By metal coupons it is meant at least two layers of different metals bonded together to make up such a metal intermediate 78 or 30. The metals of such a coupon can be bonded together by methods such as explosion bonding. The ultimate criteria for such intermediates is that: they be highly electrically conductive; the metal lying against the cell element 12 be weldably compatible with the cell element metal; and the metal layer of the coupon laying against the liner be weldably compatible with the metal of that liner. It should be noted that coupons can have more than two layers of metal. One such coupon for the anolyte compartment side is a three layer explosion bonded coupon of titanium, copper and a ferrous material.

It will be noticed that both the flat-surfaced anode 36 and the flat-surfaced cathode 46 have their peripheral edges rolled inwardly toward the cell element 12 away from the membrane 27. This is done to prevent the sometimes jagged edges of these electrodes from contacting the membrane 27 and tearing it.

It should be noted that the corners of central cell element peripheral flange 16 are built-up. This is done to allow the cell to be operated at higher pressures than atmospheric. Of course, the shape of the cell can be round as well as rectangular, or any other convenient shape. A round shape would probably be the most practical for very high pressure operations.

Figure 5:
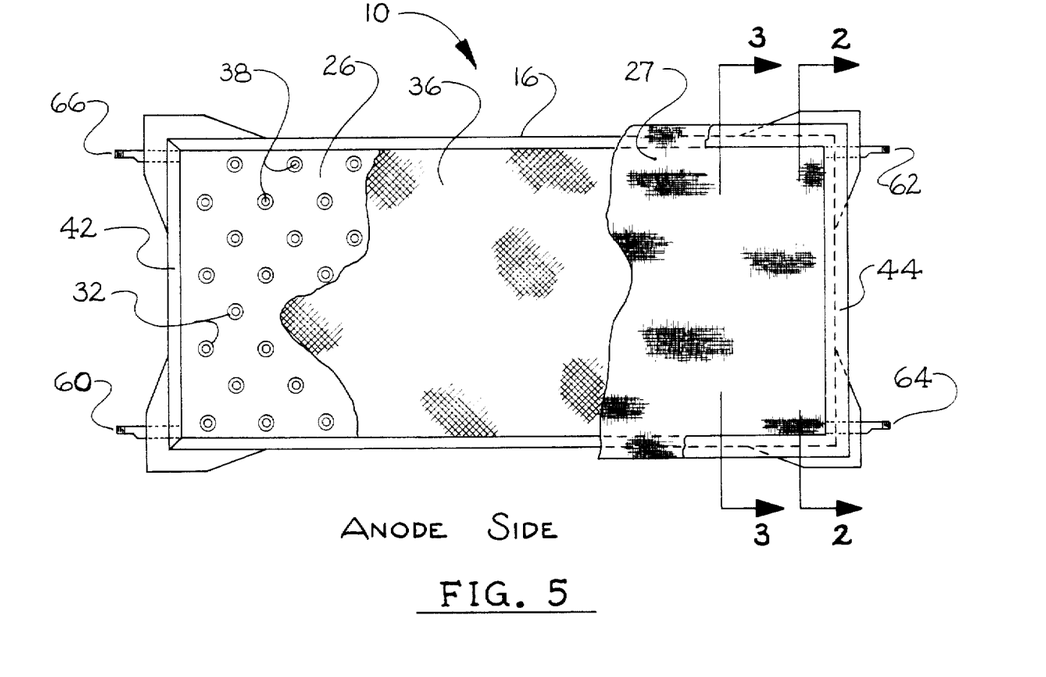
FIG. 5 is a partially broken-away front view of a bipolar electrode-type, filter press-type cell unit 10 which employs this invention and which is viewed from the anode side.

With brine as cell feed, the cell operates as follows. The feed brine is continuously fed into anolyte compartment 22 via duct 60 while fresh water may be fed into catholyte compartment 24 via duct 64. (FIGS. 4 and 5). Electric power (D.C.) is applied across the cell series in such a fashion so that the anode 36 of each electrolysis cell is positive with respect to the cathode 46 of that electrolysis cell. Excluding depolarized cathodes or anodes, the electrolysis proceeds as follows. Chlorine gas is continuously produced at the anode 36; sodium cations are transported through membrane 27 to the catholyte compartment by the electrostatic attraction of the cathode 46. In the catholyte compartment 24 there is hydrogen gas and an aqueous solution of sodium hydroxide continuously formed. The chlorine gas and depleted brine continuously flow from the anolyte chamber 22 via duct 62 while the hydrogen gas and sodium hydroxide continuously exit the catholyte compartment 24 by duct 66. Depolarized electrodes can be used to suppress the production of hydrogen or chlorine or both if desired.

In operating the cell series as an electrolysis cell series for NaCl brine, certain operating conditions are preferred. In the anolyte compartment a pH of from about 0.5 to about 5.0 is desired to be maintained. The feed brine preferably contains only minor amounts of multivalent cations (less than about 0.8 grams/liter when expressed as calcium). More multivalent cation concentration is tolerated with the same beneficial results if the feed brine contains carbon dioxide in concentrations lower than about 70 ppm when the pH of the feed brine is lower than 3.5. Operating temperatures can range from 0° to 250° C., but preferably above about 60° C. Brine purified from multivalent cations by ion-exchange resins after conventional brine treatment has occurred is particularly useful in prolonging the life of the membrane. A low iron content in the feed brine is desired to prolong the life of the membrane. Preferably the pH of the brine feed is maintained at a pH below 4.0 by the addition of hydrochloric acid.

Preferably the pressure in the catholyte compartment is maintained at a pressure slightly greater than that in the anolyte compartment, but preferably at a pressure difference which is no greater than a head pressure of about 1 foot of water. Preferably this pressure difference is controlled by surge tanks. These surge tank control of pressure is disclosed in U.S. Pat. No. 4,105,515 which is hereby incorporated by reference for the purposes of that disclosure.

Preferably the operating pressure is maintained at less than 7 atmospheres.

Usually the cell is operated at a current density of from about 1.0 to about 4.0 amperes per square inch, but in some cases operating above 4.0 amps/in. is quite acceptable.

Now to the case where a metal liner is desired on both sides of the cell structure in a chlor-alkali cell. In the example given above for electrolyzing sodium chloride brine, a catholyte side, single piece metal liner 48 made of nickel is desired when the caustic concentration in the catholyte compartment 24 is maintained above about 22 wt. % and the cell electrolyte operating temperature is maintained above about 80° C. This nickel liner 48 is formed, sized for, and fitted to the central cell element 12 in essentially the same manner as is the titanium liner 26 on the anolyte side. However, since nickel and steel are weldably compatible together themselves, there is no need to have a metal intermediate situated between them at the locations where the welds connecting the catholyte side liner 48 to the cathode boss ends 40 are located. This is not to say, however, that this invention excludes the use of weldably compatible metal intermediates between the cathode bosses 20 and the catholyte liner 48 when there is an anolyte liner 26 connected to the anode bosses 18, whether connected through metal intermediates or not. A liner may be used on one side, on both sides, or on neither side of unitary cell element 12.

Anolyte compartment 22 and catholyte compartment 24 both need fluid inlet and outlet ducts. Accordingly an anolyte compartment orifice inlet duct (not shown), an anolyte compartment orifice outlet duct 50, a catholyte compartment orifice inlet duct 56, and a catholyte compartment orifice outlet duct (not shown) are cast in the body of the flange 16 in that part of the flange which contacts their respective anolyte compartment 22 and catholyte compartment 24. When there are liners 26, 48 in these compartments, then corresponding orifices are provided in the liners. Examples of these orifices can be seen in FIG. 1 wherein an anolyte compartment orifice outlet 50 is shown cast in central cell element 12 and a corresponding anolyte liner outlet orifice 54 is shown formed in anolyte side liner 26. Anolyte side liner outlet orifice 50 and catholyte side inlet orifice 56 can be seen in FIG. 2.

Inside these orifices, conduit leads need to be placed. These conduit leads are shown in FIGS. 4 and 5 as anolyte inlet conduit 60, anolyte outlet conduit 62, catholyte inlet conduit 64, and catholyte outlet conduit 66. Note the orifices themselves are not readily observable in FIGS. 4 and 5 inasmuch as the conduits inserted inside them tend to obscure them. Thus the orifices are not numbered as such in FIGS. 4 and 5, while the conduits themselves are not shown and numbered in FIGS. 1 and 2 for the sake of clarifying their differences while simplifying the total drawing.

Now turning to a more general description of the invention. Besides ferrous materials such as iron steel, and stainless steel, cell element 12 can also be cast from any other castable metal or metal alloy such as nickel, aluminum, copper, chromium, magnesium, titanium, tantalum, cadmium, zirconium, lead, zinc, vanadium, tungsten, iridium, rhodium, cobalt, and their alloys. Catholyte side liners 48 are usually chosen from these materials also, with the general exception of magnesium and aluminum.

The anolyte side liner 26 and catholyte side liners 48 are preferably made of sufficiently workable metallic materials as to be capable of a single sheet of it being formed into the shape in which they are shown in the drawing. This includes the ability to be pressed so that they have frustroconnically shaped caps 32 and 70. It should also be understood that the invention is not limited to the caps 32, 70 being frustroconically shaped nor limited to the anode and cathode bosses 18 and 20 being frustroconnically shaped. They can be shaped and located so as to direct the flow of electrolytes and gas within the compartments 22 and 24. Bosses 18 and 20 should have their ends 28 and 40 flat and parallel with the flat electrode surface to which they are going to be connected. The ends 28 and 40 of the bosses 18 and 20 should present sufficient surface area to which electrical connections can be made to their respective electrodes to provide an electrical path with sufficiently low electrical resistance. The bosses 18 and 20 should be spaced so they provide a fairly uniform and fairly low electrical potential gradient across the face of the electrode to which they are attached. They should be spaced so that they allow free electrolyte circulation from any unoccupied point within their respective electrolyte compartment to any other unoccupied point within that compartment. Thus the bosses will be fairly uniformly spaced apart from one another in their respective compartments. It should be noted here that although anode bosses 18 and cathode bosses 20 are shown in a back to back relationship across central barrier 14, they need not be. They can be offset from each other across barrier 14.

The materials from which anode and cathode bosses 18 and 20 are, of course, the same as that of the cell element 12 since part of this invention is to make them an intergal part of that cell element.

As to the anolyte side and catholyte side liners 26 and 48, they are required to be electrically conductive, resistant to chemical attack from the electrolyte compartment environment to which they are exposed, and sufficiently ductile to form the indented caps 32, 70.

Of course, the metals from which anolyte side liner 26 and catholyte side liner 48 are usually different because of the different electrolyte corrosion and electrolytic corrosion conditions to which they are exposed. This is true not only in chlor-alkali cell electrolytes, but also in other electrolytes. Thus the metals chosen must be chosen to fit the conditions to which they are going to be exposed. Typically titanium is the preferred metal for the anolyte compartment liner 26. Other metals suitable for such conditions can usually be found in the following group: titanium, titanium alloys, tantalum, tantalum alloys, niobium, niobium alloys, hafnium, hafnium alloys, zirconium and zirconium alloys.

The number of metals suitable for the catholyte side liner 48 is usually much larger than the number suitable for the anolyte compartment side principally due to the fact that most metals are immune from chemical attack under the relatively high pH conditions present in the catholyte and due to the electrical cathodic protection provided by the metal on the anolyte side of the cell structure 12. Ferrous materials are usually preferred as the metals for the catholyte side liner. This includes steel and stainless steel. Other usually suitable liner 48 material includes nickel, chromium, tantalum, cadmium, zirconium, lead, zinc, vanadium, tungsten, iridium, cobalt and alloys of each of these metals.

As a general rule, the metal which is used for catholyte side liner 48 is also suitable for use in making the cathode 46. This is similarly true for the metal of the anolyte side liner 26 and its anode 36.

When a liner metal is used which is weldably incompatible with the metal of the cell structure 12, and when the liner 26 or 48 is to be connected to the cell structure 12 by welding, then metal intermediates are positioned between the cell structure bosses and the metal liner at the location where the welds are to be made. These metal intermediates may be in the form of a single metal wafer, in the form of a multilayered metal coupon, or in the form of a metal film formed either on the cell structure 12 or the liner 26 or 48.

EXAMPLE 1

A cell structure specimen was cast of SA-216, grade WCB steel. The thickness of the central barrier was approximately $\frac{1}{2}$" thick. The base diameter of the frustroconnical boss was 3" and the top diameter was $1\frac{1}{4}$". Overall dimensions of the structure were approximately 16"×20", with ten bosses located on each side (anode and cathode) and directly opposed. The end to end distance of the bosses was about $2\frac{1}{2}$".

The finished casting showed surfaces of excellent quality. Sections were cut for further examination. Internal voids in boss sections were minimal or non-existant. The cell structure quality was deemed well suited for bipolar electrode service.

EXAMPLE 2

A cell structure speciment was cast of SA-216 Grade WCB steel. This particular structure represented a corner section for the proposed cell designed. Overall dimensions for the structure were approximately 24"×24" with the central barrier being ½" thick. The base diameter of the frustoconical bosses was 3" and the top diameter was 1½". The end to end distance of the bosses was about 2½", as was the thickness of the periphery.

After casting, the specimen was machined on both anode and cathode sides so as to provide two parallel planes. The anolyte and catholyte peripheral structures were closely examined. No large voids and few small voids were found. The lateral faces of the periphery were suitable for finishing with a minimum amount of machine work necessary to meet gasketing and sealing requirements. Sections cut from the specimen revealed minimal or non-existant voids.

EXAMPLE 3

Cell structures were cast for a nominal 4 foot by 8 foot electrolyzer press. The purpose of this example was to verify the castability of the particular shape and determine minimum central barrier thickness. The thickness of the central barrier of this structure was approximately 9/16". The base diameter of the frustoconical bosses was 3" and the top diameter was 1½". The end to end distance of the bosses was about 2½", as was the thickness of the periphery. The surfaces of the anode and cathode side were of acceptable quality with only minor surface imperfections present on the cope side of the casting. In repetitive use of the mold, no substantial variation in casting quality was observed. This example demonstrates that a steel casting of this size and shape was feasible for mass production of a cell structure.

We claim:

1. In the cell structure used in forming a bipolar electrode-type, filter press-type electrolytic cell unit, which unit is capable of being combined with other cell units to form a cell series; wherein in said series the cell structure is separated from adjacent cell structures by ion-exchange permselective membranes which are sealably disposed between each of the cell structures so as to form a plurality of electrolysis cells; each of said electrolysis cells having at least one planarly disposed membrane separating the anolyte compartment and catholyte compartment of each electrolysis cell; said cell structure having a central barrier which physically separates the anolyte compartment of an electrolysis cell located on one side of the barrier from the catholyte compartment of an adjacent electrolysis cell located on the opposite side of the barrier; said central barrier having a planarly disposed anode situated in its adjacent anolyte compartment and a planarly disposed cathode situated in its adjacent catholyte compartment with both electrode faces being substantially parallel to their planarly disposed membranes; said central barrier having the anode of the adjacent anolyte compartment electrically connected through it to the cathode of the adjacent catholyte compartment; said anolyte and catholyte compartments which are adjacent to the central barrier having a peripheral structure around their periphery to complete the physical definition of said compartments; said cell structure also having an electrical current transfer means associated with it for providing electrical current paths through the central barrier from its adjacent catholyte compartment to its adjacent anolyte compartment; and which cell structure includes anode and cathode stand-off means for maintaining the anode and cathode of the two electrolysis cells adjacent the central barrier at predetermined distances from the central barrier; the improvement which comprises:

the central barrier, the anolyte and catholyte compartment peripheral structures, the anode stand-off means, the cathode stand-off means, and at least part of the electrical current transfer means all being integrally formed into a unitary central cell element made from a single casting of a castable metal; and, further, said castable metal being electrically conductive so as to be the part of the electrical current transfer means which transfers electricity through the central barrier from the adjacent catholyte compartment to the adjacent anolyte compartment; and said unitary central cell element being simultaneously formed in such a fashion so as to provide the structural integrity required to physically support the adjacent electrolyte compartments while loaded with electrolyte as well as to support the associated electrolysis cell appurtances which are desired to be supported by the unitary central cell element; and said anode stand-off means and that part of the electrical current connecting means located in the unitary central cell element on the anolyte side of the central barrier being combined into a multiplicity of anode bosses projecting a predetermined distance outwardly from the central barrier into the anolyte compartment adjacent the central barrier, said anode bosses being capable of being mechanically and electrically connected either directly to the anode of said anolyte compartment or indirectly to said anode through at least one compatible metal intermediate directly situated in an abutting fashion between said anode and said anode bosses; and said cathode stand-off means and that part of the electrical current connecting means located on the catholyte side of the central barrier being combined into a multiplicity of cathode bosses projecting a predetermined distance outwardly from the central barrier into the catholyte compartment adjacent the central barrier, said cathode bosses being capable of being mechanically and electrically connected either directly to the cathode in said adjacent catholyte compartment or indirectly to the cathode through at least one weldably compatible metal intermediate directly situated in an abutting fashion between said cathode and said cathode bosses; and said anode bosses being spaced apart in a fashion such that anolyte can freely circulate throughout the totality of the otherwise unoccupied adjacent anolyte compartment, and, likewise, said cathode bosses being spaced apart in a fashion such that catholyte can freely circulate throughout the totality of the otherwise unoccupied adjacent catholyte compartment.

2. The improvement of claim 1 wherein the castable metal of the unitary central cell element is selected from the group consisting of: iron, steel, stainless steel, nickel, aluminum, copper, chromium, magnesium, tantalum, cadmium, zirconium, lead, zinc, vanadium, tungsten, iridium, rhodium, cobalt, alloys of each, and alloys thereof.

3. The improvement of claim 1 wherein the metal of the unitary central cell element is selected from the group consisting of ferrous metals.

4. The improvement of claim 1 which further comprises an anolyte side liner made of a metal sheet fitted over those surfaces on the anolyte compartment side of the cell structure which would otherwise be exposed to the corrosive environment of the anolyte compartments;

said anolyte side liner being an electrically conductive metal which is essentially resistant to corrosion due to the anolyte compartment environment;

said metal liner being formed so as to fit over and around the anode bosses and said liner being connected to the unitary central cell element at the anode bosses; and said liner being depressed sufficiently around the spaced anode bosses toward the central barrier in the spaces between the bosses so as to allow free circulation of the anolyte between the lined unitary central cell element and the membrane of the adjacent anolyte chamber, the liner replacing the unitary central cell element surface adjacent to the anolyte chamber as one boundary contacting the anolyte.

5. The improvement of claim 4 wherein the metal liner is connected to the anode bosses by welding through a metal intermediate which is disposed between the bosses and the liner, the metal of the metal intermediate being not only weldable itself, but also being weldably compatible with both the metal of the anolyte side liner and the metal of which the unitary central cell element is made, that is weldably compatible with both metals to the point of being capable of forming a ductile solid solution with them at welds of them upon their welding.

6. The improvement of claim 4 wherein the unitary cell element is made of a ferrous material and wherein the anolyte side liner is made of a metallic material selected from the group consisting of titanium, titanium alloys, tantalum, tantalum alloys, niobium, niobium alloys, hafnium, hafnium alloys, zirconium and zirconium alloys.

7. The improvement of claim 6 wherein there are metal coupons situated in an abutting fashion between the anode bosses and the anolyte side liner, with each coupon having at least two metal layers bonded together and with the outside metal layer of one side of the coupon abutting the anode boss and the outside metal layer of the opposite side of the coupon abutting the anolyte side liner, the metal layer of the coupons which abuts each anode boss being weldably compatible with the ferrous material of which the anode bosses are made and accordingly being welded to said anode bosses, and the metal layer of that side of the coupons abutting the anolyte side liner being weldably compatible with the metallic material of which the anolyte side liner is made and accordingly being welded to said liner so that the liner is welded to the anode bosses through the coupons.

8. The improvement of claim 4 wherein the anolyte side liner is made of titanium or a titanium alloy, and wherein the castable material from which the unitary central cell element is made is a ferrous material.

9. The improvement of claim 8 wherein vanadium wafers are interposed between the anode bosses and the adjacent anolyte side liner, and the titanium anolyte side liner is welded to the ferrous material bosses through the vanadium wafers.

10. The improvement of claim 4 wherein the metal intermediates situated between the anode bosses and the adjacent anolyte side liner are joined to the ends of the anode bosses by a film-forming process.

11. The improvement of claim 4 wherein no metal intermediate is used between the liner and the anode bosses, but wherein the anolyte side liner is directly bonded to the anode bosses by welding.

12. The improvement of claim 4 wherein no metal intermediate is used, but wherein the anolyte side liner is bonded directly to the anode bosses by explosion bonding.

13. The improvement of claim 4 wherein the anolyte side metal liner extends over the lateral face of the anolyte compartment peripheral structure so as to form a sealing face thereat for the membrane when the cell segments are squeezed together to form a cell series.

14. The improvement of claim 4 wherein the anolyte side liner is connected to the unitary central cell element at the ends of the anode bosses.

15. The improvement of claim 4 wherein the anolyte side liner is welded to the ends of the anode bosses through an intermediate metal coupon or wafer.

16. The improvement of claim 1 which further comprises a catholyte side liner made of a single metal sheet fitted over those surfaces of the unitary central cell element which would otherwise be exposed to the catholyte compartment of the adjacent electrolysis cell;

said catholyte side liner being an electrically conductive metal which is essentially resistant to corrosion due to the catholyte compartment environment;

said liner being depressed sufficiently around the spaced cathode bosses toward the central barrier in the spaces between the bosses so as to allow free circulation of the catholyte between the lined unitary central cell element and the membrane of the adjacent catholyte chamber, the liner replacing the unitary central cell element surface adjacent to the catholyte chamber as one boundary contacting the catholyte.

17. The improvement of claim 16 wherein the metal liner is connected to the cathode bosses by welding through a metal intermediate which is disposed between the bosses and the liner, the metal of the metal intermediate being not only weldable itself, but also being weldably compatible with both the metal of the catholyte side liner and the metal of which the unitary cell element is made, that is weldably compatible with both metals to the point of being capable of forming a ductile solid solution with them at the welds upon welding.

18. The improvement of claim 16 wherein the unitary cell element is made of a ferrous material and wherein the catholyte side metal liner is selected from the group consisting of ferrous materials, nickel, nickel alloys, chromium, tantalum, cadmium, zirconium, lead, zinc, vanadium, tungsten, iridium, and cobalt.

19. The improvement of claim 16 wherein there are metal coupons situated between the cathode bosses and the catholyte side liner, with each coupon having at least two metal layers bonded together, the metal layer of the coupons which abuts each cathode boss being weldably compatible with the ferrous material of which the anode bosses are made and accordingly being welded to said cathode bosses, and the metal layer of that side of the coupons abutting the catholyte side liner being weldably compatible with the metallic material of which the catholyte side liner is made and accordingly being welded to said liner so that the liner is welded to the cathode bosses through the coupons.

20. The improvement of claim 16 wherein the metal of the unitary central cell element, of the catholyte side liner, and of the cathode of the adjacent electrolysis cell are all selected from the group consisting of ferrous materials.

21. The improvement of claim 16 wherein the metal intermediates situated between the cathode bosses and the adjacent catholyte side liner are joined to the ends of the cathode bosses by a film-forming process.

22. The improvement of claim 16 wherein the metal of said catholyte liner is compatible with the direct welding of it to the metal of the unitary central cell element and also directly weldable to the cathode of the cathode compartment;

the metal liner being formed so as to fit over and around the ends of the cathode bosses and welded directly on one side of the liner to the bosses in a manner so as to provide an electrical connection between the unitary central cell element and the cathode which itself is directly welded to the opposite side of the cathode side liner.

23. The improvement of claim 16 wherein the catholyte side metal liner extends over the lateral face of the catholyte compartment peripheral structure so as to form a sealing face thereat for the membrane when the cell segments are squeezed together to form a cell series.

24. A process for electrolyzing sodium chloride brine comprised of passing electricity through a series of electrolysis cells whose cell structures are comprised of the adjoining unitary cell elements defined in claim 1.

25. The process of claim 24 wherein a cation exchange membrane is used to separate said anode compartment from said cathode compartment.

26. The process of claim 25 wherein the cation exchange membrane has sulfonic acid groups as its functional groups.

27. The process of claim 25 wherein the cation exchange membrane has carboxylic acid groups as its functional groups.

28. The process of claim 25 wherein the cation exchange membrane comprises a combination of sulfonic acid groups and carboxylic acid groups.

29. The process of claims 25, 26, 27 or 28 wherein the cation exchange membranes are reinforced to impair deforming during electrolysis conditions.

30. The process of claims 25, 26, 27 or 28 wherein the cation exchange membranes are not reinforced to decrease the electrical resistivity of said membrane.

31. The process of claim 24 wherein the sodium chloride aqueous solution electrolyzed is maintained at a pH of between about 0.5 and about 5.0 during electrolysis.

32. The process of claim 24 wherein the brine solution electrolyzed in the cells contains no more than about 0.08 milligrams per liter of calcium.

33. The process of claim 24 wherein calcium is removed from the brine to a level of concentration of no greater than about 0.08 milligrams per liter prior to the brine being electrolyzed by a multivalent cation removal process which includes passage of the brine through at least one chelating ion exchange resin bed.

34. The process of claim 24 which includes electrolyzing brine which contains carbon dioxide in concentrations no greater than about 70 parts per million as measured just prior to the brine being electrolyzed when the pH of the brine is maintained at a level lower than 3.5 by a process which includes the addition of hydrochloric acid to the brine prior to its being electrolyzed.

35. The process of claim 24 wherein the temperature of the brine is maintained at a level greater than about 80° C.

36. The process of claim 24 which further comprises maintaining the catholyte chamber pressure at a slightly greater pressure than the pressure of the anolyte compartment so as to gently urge the permselective, ionexchange membrane separating the two compartments toward and against a "flat plate" foraminous anode disposed parallel to the planarly disposed membrane; which anode is electrically and mechanically connected to the anode bosses of the unitary central cell element.

37. The process of claim 24 which further comprises operating the cell at an electrolyte pressure of less than about seven atmosphere.

38. The process of claim 24 which further comprises operating the electrolysis cell at an electrical current density of from about 0.5 to about 5.0 ampers per square inch of anode surface.

39. The process of claim 24 wherein the electrolysis is carried out while circulating the anolyte through the anode compartment via forced circulation.

40. The process of claim 24 wherein the electrolysis is carried out while circulating the catholyte through the cathode via forced circulation.

41. The process of claim 24 wherein the electrolysis is carried out while circulating both the anolyte and catholyte through their respective compartments via forced circulation.

42. The process of claim 24 wherein the soluble silica is removed from the brine electrolyzed to a level of concentration of no greater than about 4 mg./liter prior to its being electrolyzed.

43. The process of claim 24 wherein iron compounds and other multivalent metals are removed from the brine electrolyzed to a level of concentration of no greater than about 0.05 mg./liter prior to the electrolysis of the brine in order to increase the life of the membrane and electrodes.

44. The process of claim 24 wherein the aqueous sodium hydroxide solution is produced with a sodium chloride content of no more than 350 ppm based on 100% sodium hydroxide.

45. The process of claim 24 wherein sulfate is removed from the brine electrolyzed to a level of concentration of no greater than about 5.0 g./liter prior to the electrolysis of the brine.

46. The process of claim 24 wherein the electrolysis is carried out while circulating the catholyte through the cathode via a gas lift method.

47. The process of claim 24 wherein the electrolysis is carried out while circulating the anolyte through the anode via a gas lift method.

* * * * *

UNITED STATES PATENT AND TRADEMARK OFFICE
CERTIFICATE OF CORRECTION

PATENT NO. : 4,488,946
DATED : December 18, 1984
INVENTOR(S) : Gregory J. E. Morris, Richard N. Beaver, Sandor Grosshandler, Hiep D. Dang, John R. Pimlott It is certified that error appears in the above—identified patent and that said Letters Patent is hereby corrected as shown below:

Col. 5, line 64, change "structurlarly" to --structurally--.

Col. 7, line 21, change "metel" to --metal--.

Col. 8, line 11, insert --of-- between the words "consisting" and "ferrous".

Col. 11, line 1, change "taking" to --taken--.

Col. 12, line 45, delete the word "of".

Col. 14, line 35, change "foranimous" to --foraminous--.

Col. 17, line 39, change "frustroconnically" to --frustroconically--.

Col. 17, line 43, change "frustroconnically" to --frustroconically--.

Col. 18, line 2, change "intergal" to --integral--.

UNITED STATES PATENT AND TRADEMARK OFFICE
CERTIFICATE OF CORRECTION

PATENT NO. : 4,488,946

DATED : December 18, 1984

INVENTOR(S) : Gregory J. E. Morris, Richard N. Beaver, Sandor Grosshandler, Hiep D. Dang, John R. Pimlott It is certified that error appears in the above—identified patent and that said Letters Patent is hereby corrected as shown below:

Col. 18, lines 52-53, change "frustroconnical" to --frustroconical--.

Col. 18, line 65, change "speciment" to --specimen--.

Col. 24, lines 15-16, insert a hyphen in "ionexchange" to read --ion-exchange--.

Col. 24, line 26, change "ampers" to --amperes--.

Signed and Sealed this

Sixth Day of August 1985

[SEAL]

Attest:

DONALD J. QUIGG

Attesting Officer

Acting Commissioner of Patents and Trademarks